May 15, 1928. D. G. MacKINNON Re. 16,962

PAD FOR ARTIFICIAL TEETH AND METHOD OF PREPARING SAME

Original Filed Feb. 2, 1925

Inventor

Daniel G. MacKinnon.

By Cushman Bryant & Darby

Attorneys

Reissued May 15, 1928. Re. 16,962

UNITED STATES PATENT OFFICE.

DANIEL G. MACKINNON, OF PLEASANTVILLE, NEW JERSEY.

PAD FOR ARTIFICIAL TEETH AND METHOD OF PREPARING SAME.

Original No. 1,577,134, dated March 16, 1926, Serial No. 6,370, filed February 2, 1925. Application for reissue filed February 10, 1928. Serial No. 253,492.

The present invention relates to dental devices, and more particularly to means for use in connection with dental plates, whereby the discomfort ordinarily incident to the use of artificial teeth may be materially reduced, and, in many instances, eliminated.

Many persons find great difficulty in keeping the lower plate in position, and a very general complaint is that the plate causes almost constant annoyance and pain.

The difficulty is due very often to the fact that there is a small, but nevertheless perceptible shrinkage of the gum after the plate has been worn for some time, so that there results considerable play and looseness of the plate, although when first fitted it may have been of the proper dimensions. When it becomes loose, the plate, since it is comparatively hard, rubs and irritates the gum.

An object of the present invention is to provide a pad or cushion to be interposed between the lower plate and the gum and adapted to relieve the pressure upon the gum and afford a sufficient suction to hold the plate in place.

A further object of the invention is to provide a cushion or pad which will be thoroughly aseptic, may be quickly applied to the plate, and which will retain its shape until used.

Other objects of the invention will become apparent as the description proceeds in connection with the accompanying drawings, wherein Figure 1 is a view of the blank from which the pad is formed.

Figure 1:
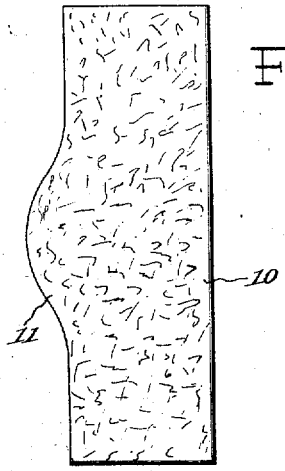
Figure 2:
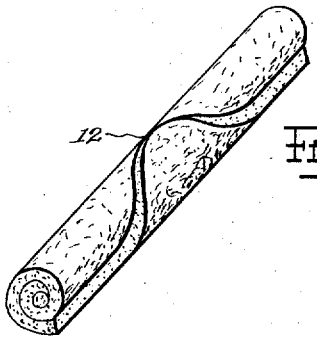
Figure 2 is a perspective view showing the pad at an intermediate stage and before it is bent to U-shape.

Referring to the drawings, the pad is formed from a blank 10 of soft absorbent material, such as cotton. One edge of the blank is cut to provide a central extension 11 so that when the blank is rolled to the form shown in Figure 2, the intermediate portion 12 of the roll will be thicker or of greater diameter than the remainder.

After the roll (Figure 2) is formed, it is preferably saturated with a solution, which, when dried, sufficienty stiffens the pad to retain its shape. The solution may be of aseptic character so as to have a soothing or healing effect. It has been found that one containing boric and benzoic acids, such as listerine, is highly satisfactory. This product, under the action of heat, suitably stiffens the pad to retain the U-shape to which it is bent.

Figure 3:
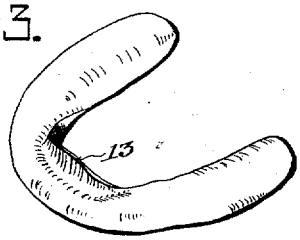
Figure 3 is a perspective of the completed pad or cushion.
Figure 4:
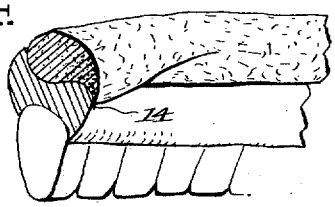
Figure 4 is a sectional view, in perspective, showing a plate inverted and with the pad applied.

After saturation, the roll is bent to the U-shape shown in Figure 3, and at its middle portion there is formed a lip 13 which will fit over the inner edge 14 of the plate. The lip may be formed by placing the roll in a mold or other suitable shaping device, and in order that it may remain after the molding operation, the lip should, preferably, be coated with a stiffening agent, such as acacia.

The roll, while still in its U-shape, and if desired, while in the mold, should be subjected to heat sufficient to dry the acacia and the aseptic solution. When removed from the mold after treatment with heat, the lip 13 will be comparatively hard and the remainder of the pad, while soft, is sufficiently stiff to maintain the form imparted to it by the mold. Thus, there is no necessity for tying or wrapping means to prevent disintegration of the pad, and yet, under the action of moisture when in use, the entire pad will become relatively soft, since the stiffening action of the aseptic solution will be overcome by moisture. The lip 13 being relatively hard, due to the coating of acacia, will fit snugly over the inner edge of the plate and prevent the pad from being accidentally dislodged during mastication or talking. Although the stiffening action of the dry aseptic solution is quickly overcome by the moisture, the aseptic effect remains for a prolonged period, thus affording the desired protection and preventing a drying or parching sensation when the cushion is inserted.

It should be understood that numerous changes may be made in the embodiment of the invention illustrated and described without departing from the invention which is defined by the following claims.

I claim:—

1. A pad or cushion to be worn between the gums and lower plate of artificial teeth comprising a roll of cotton bent into U-shape to fit the contour of the plate and formed at its middle portion with a lip adapted to fit over the inner edge of the plate, said lip being treated with a hardening agent to retain its form.

2. A pad or cushion to be worn between the gums and lower plate of artificial teeth comprising a roll of cotton bent into U-shape to fit the contour of the plate, said pad being treated with an agent adapted to retain its shape.

3. A pad or cushion to be worn between the gums and lower plate of artificial teeth comprising a roll of cotton bent into U-shape to fit the contour of the plate, said pad being treated with an agent adapted to retain its shape but to permit softening in the presence of moisture.

4. A pad or cushion to be worn between the gums and lower plate of artificial teeth comprising a roll of cotton bent into U-shape to fit the contour of the plate and formed at its middle portion with a lip adapted to fit over the inner edge of the plate, said pad being treated with a stiffening agent adapted to be carried off by the action of moisture.

5. A pad or cushion to be worn between the gums and lower plate of artificial teeth comprising a roll of cotton bent into U-shape to fit the contour of the plate, said pad being treated with an antiseptic agent adapted to retain its shape but to permit softening in the presence of moisture.

6. A pad or cushion to be worn between the gums and lower plate of artificial teeth comprising a roll of cotton bent into U-shape to fit the contour of the plate and formed at its middle portion with a lip adapted to fit over the inner edge of the plate, said pad being treated with an antiseptic stiffening agent adapted to be carried off by the action of moisture.

7. The method of preparing a pad or cushion to be worn between the gums and lower plate of artificial teeth which consists of the following steps in suitable order: (1) forming a roll of cotton and bending the same into a U-shape to fit the plate, (2) treating the roll with an agent adapted to stiffen the same under the action of heat and which will be carried off by the action of moisture, and (3) subjecting the impregnated roll to the action of heat while in said U-shape.

8. The method of preparing a pad or cushion to be worn between the gums and lower plate of artificial teeth which consists of the following steps in suitable order: (1) forming a roll of cotton and bending the same into a U-shape to fit the plate, (2) treating the roll with an agent adapted to stiffen the same under the action of heat and which will be carried off by the action of moisture, (3) forming at the middle portion of the roll a lip adapted to fit over the inner edge of the plate, (4) coating the lip with a hardening agent, and (5) subjecting the impregnated roll to the action of heat while in said U-shape.

9. A pad or cushion to be worn between the gums and lower plate of artificial teeth comprising a roll of soft material bent into U-shape to fit the contour of the plate and formed at its middle portion with a lip adapted to fit over the inner edge of the plate, said lip being treated with a hardening agent to retain its form.

10. A pad or cushion to be worn between the gums and lower plate of artificial teeth comprising a roll of soft material bent into U-shape to fit the contour of the plate, said pad being treated with an agent adapted to retain its shape.

11. A pad or cushion to be worn between the gums and lower plate of artificial teeth comprising a roll of soft absorbent material bent into U-shape to fit the contour of the plate, said pad being treated with an agent adapted to retain its shape but to permit softening in the presence of moisture.

12. A pad or cushion to be worn between the gums and lower plate of artificial teeth comprising a roll of soft absorbent material bent into U-shape to fit the contour of the plate and formed at its middle portion with a lip adapted to fit over the inner edge of the plate, said pad being treated with a stiffening agent adapted to be carried off by the action of moisture.

13. A pad or cushion to be worn between the gums and lower plate of artificial teeth comprising a roll of soft material bent into U-shape to fit the contour of the plate, said pad being treated with an antiseptic agent adapted to retain its shape but to permit softening in the presence of moisture.

14. A pad or cushion to be worn between the gums and lower plate of artificial teeth comprising a roll of soft material bent into U-shape to fit the contour of the plate and formed at its middle portion with a lip adapted to fit over the inner edge of the plate, said pad being treated with an antiseptic stiffening agent adapted to be carried off by the action of moisture.

15. The method of preparing a pad or cushion to be worn between the gums and lower plate of artificial teeth which consists of the following steps in suitable order: (1) forming a roll of soft material and bending the same into a U-shape to fit the plate, (2) treating the roll with an agent adapted to stiffen the same under the action of heat and which will be carried off by the action of moisture, and (3) subjecting the impregnated roll to the action of heat while in said U-shape.

16. The method of preparing a pad or cushion to be worn between the gums and lower plate of artificial teeth which consists of the following steps in suitable order: (1) forming a roll of soft material and bending the same into a U-shape to fit the plate, (2) treating the roll with an agent adapted to stiffen the same under the action of heat and which will be carried off by the action of moisture, (3) forming at the middle portion of the roll a lip adapted to fit over the inner edge of the plate, (4) coating the lip with a hardening agent, and (5) subjecting the impregnated roll to the action of heat while in said U-shape.

In testimony whereof, I have hereunto set my hand this 30th day of Jan., 1928.

DANIEL G. MacKINNON.